US008829132B2

(12) United States Patent
Taguchi et al.

(10) Patent No.: US 8,829,132 B2
(45) Date of Patent: Sep. 9, 2014

(54) ETHYLENE/TETRAFLUOROETHYLENE COPOLYMER

(75) Inventors: Daisuke Taguchi, Tokyo (JP); Shigeru Aida, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 36 days.

(21) Appl. No.: 13/348,139

(22) Filed: Jan. 11, 2012

(65) Prior Publication Data

US 2012/0108774 A1 May 3, 2012

Related U.S. Application Data

(63) Continuation of application No. PCT/JP2010/061562, filed on Jul. 7, 2010.

(30) Foreign Application Priority Data

Jul. 13, 2009 (JP) ................................. 2009-164415

(51) Int. Cl.
C08F 214/26 (2006.01)
C08F 214/18 (2006.01)

(52) U.S. Cl.
CPC ......... *C08F 214/265* (2013.01); *C08F 214/186* (2013.01); *C08F 214/26* (2013.01)
USPC ........................ 526/255; 526/253; 526/348.8

(58) Field of Classification Search
CPC . C08F 214/265; C08F 214/26; C08F 214/186
USPC ....................................................... 526/255
See application file for complete search history.

(56) References Cited

U.S. PATENT DOCUMENTS

| 4,133,798 | A | * | 1/1979 | Nishimura et al. | ........... 524/485 |
| 4,614,276 | A | * | 9/1986 | Ihara et al. | ..................... 215/364 |
| 4,677,175 | A | * | 6/1987 | Ihara et al. | ..................... 526/254 |
| 4,730,029 | A | * | 3/1988 | Wachi et al. | .................. 526/429 |
| 6,461,719 | B1 | | 10/2002 | Ichikuni et al. | |
| 6,579,960 | B2 | * | 6/2003 | Kamiya et al. | ................ 526/250 |
| 7,019,079 | B2 | * | 3/2006 | Sumi et al. | ..................... 525/199 |
| 7,112,640 | B2 | * | 9/2006 | Funaki et al. | .................. 526/249 |
| 7,361,717 | B2 | * | 4/2008 | Aida et al. | ..................... 526/247 |
| 7,462,396 | B2 | * | 12/2008 | Aida et al. | ..................... 428/421 |
| 7,820,774 | B2 | * | 10/2010 | Aida et al. | ..................... 526/255 |
| 7,927,690 | B2 | * | 4/2011 | Taguchi et al. | ............... 428/219 |
| 2009/0226690 | A1 | * | 9/2009 | Taguchi et al. | ............... 428/219 |
| 2009/0301752 | A1 | * | 12/2009 | Aida et al. | .............. 174/110 SR |

FOREIGN PATENT DOCUMENTS

| EP | 0 939 088 A1 | 9/1999 |
| EP | 1 090 955 A1 | 4/2001 |
| EP | 1 336 627 A1 | 8/2003 |
| JP | 60-248710 | 12/1985 |
| JP | 07-041522 | 2/1995 |
| JP | 2001-206913 | 7/2001 |
| WO | WO 99/67333 | 12/1999 |
| WO | WO 2008069278 A1 * | 6/2008 |
| WO | WO 2009/096544 A1 | 8/2009 |
| WO | WO 2010/123002 A1 | 10/2010 |

OTHER PUBLICATIONS

International Search Report issued Sep. 14, 2010 in PCT/JP2010/061562 filed Jul. 7, 2010.
Extended Search Report issued Oct. 18, 2012 in European Patent Application No. 10799764.5-1214.

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

To provide an ethylene/tetrafluoroethylene copolymer which is excellent in heat resistance and flexibility. An ethylene/tetrafluoroethylene copolymer comprising repeating units (A) based on tetrafluoroethylene and repeating units (B) based on ethylene in a ratio of repeating units (A)/repeating units (B)=66/34 to 75/25 (molar ratio) and as an optional component, repeating units (C) based on a monomer represented by $CH_2=CX(CF_2)_nY$ (wherein each of X and Y which are independent of each other is a hydrogen atom or a fluorine atom, and n is from 2 to 8) in an amount of from 0 to 1 mol % based on the total number of moles of the repeating units (A) based on tetrafluoroethylene and the repeating units (B) based on ethylene, and having a volume flow rate measured at 297° C. of from 4 to 1,000 mm³/sec and an elastic modulus of at most 500 MPa.

16 Claims, No Drawings

ETHYLENE/TETRAFLUOROETHYLENE COPOLYMER

This application is a Continuation application of PCT/JP10/061,562 filed Jul. 7, 2010.

TECHNICAL FIELD

The present invention relates to an ethylene/tetrafluoroethylene copolymer.

BACKGROUND ART

An ethylene/tetrafluoroethylene copolymer (hereinafter sometimes referred to as ETFE) is excellent in heat resistance, chemical resistance, electrical insulating properties, flame retardancy, weather resistance and molding processability and thus is widely used as an insulating coating material for electric wires to be used for aircrafts, atomic power plants, automobiles or industrial robots, industrial tubes, tubes for fuel pipes, horticultural covering films, etc.

However, commercially available ETFE has a flexural modulus of elasticity of from 700 to 900 MPa, and the flexibility of such an ETFE is insufficient in applications required to have a flexibility such as tubes or films.

An ETFE is disclosed which is excellent in the flexibility and transparency wherein the molar ratio of repeating units based on tetrafluoroethylene (hereinafter referred to as TFE)/repeating units based on ethylene in ETFE is from 50/50 to 60/40, and the content of a fluorovinyl monomer which is copolymerizable to tetrafluoroethylene and ethylene is from 2 to 7 mol % (Patent Document 1). However, the flexural modulus of elasticity of ETFE described in Examples of Patent Document 1 is not low enough. Further, ETFE described in Comparative Examples has a low heat resistance.

An ETFE is proposed which has a content of repeating units based on TFE of from 62 to 90 mol % based on the total repeating units in ETFE and thereby has a low flexural modulus of elasticity and improved flame retardancy (Patent Document 2). However, an ETFE described in Example 3 of Patent Document 2 has a low melting point, an inferior heat resistance and a high flexural modulus of elasticity. An ETFE described in Example 6 has a low volume flow rate (flow value ($mm^3$/sec)), and its molding property is inferior. Therefore, such an ETFE is impractical.

PRIOR ART DOCUMENT

Patent Document

Patent Document 1: JP-A-7-41522
Patent Document 2: JP-A-60-248710

DISCLOSURE OF INVENTION

Technical Problem

It is an object of the present invention to provide an ETFE which is excellent in heat resistance and flexibility.

Solution to Problem

The present invention provides ETFE having the following constructions.

(1) An ethylene/tetrafluoroethylene copolymer comprising repeating units (A) based on tetrafluoroethylene and repeating units (B) based on ethylene in a ratio of repeating units (A)/repeating units (B)=66/34 to 75/25 (molar ratio) and as an optional component, repeating units (C) based on a monomer represented by $CH_2=CX(CF_2)_nY$ (wherein each of X and Y which are independent of each other is a hydrogen atom or a fluorine atom, and n is from 2 to 8) in an amount of from 0 to 1 mol % based on the total number of moles of the repeating units (A) based on tetrafluoroethylene and the repeating units (B) based on ethylene, and having a volume flow rate measured at 297° C. of from 4 to 1,000 $mm^3$/sec and an elastic modulus of at most 500 MPa.

(2) The ethylene/tetrafluoroethylene copolymer according to the above (1), wherein the ethylene/tetrafluoroethylene copolymer consists of the repeating units (A) based on tetrafluoroethylene and the repeating units (B) based on ethylene.

(3) The ethylene/tetrafluoroethylene copolymer according to the above (1), wherein the ethylene/tetrafluoroethylene copolymer contains the repeating units (C) based on a monomer represented by $CH_2=CX(CF_2)_nY$ (wherein each of X and Y which are independent of each other is a hydrogen atom or a fluorine atom, and n is from 2 to 8), and the content of the repeating units (C) is from 0.01 to 1 mol % based on the total number of moles of the repeating units (A) based on tetrafluoroethylene and the repeating units (B) based on ethylene.

(4) The ethylene/tetrafluoroethylene copolymer according to the above (1) or (3), wherein the ethylene/tetrafluoroethylene copolymer consists of the repeating units (A) based on tetrafluoroethylene, the repeating units (B) based on ethylene and the repeating units (C) based on the monomer represented by $CH_2=CX(CF_2)_nY$.

(5) The ethylene/tetrafluoroethylene copolymer according to the above (1), (3) or (4), wherein the monomer represented by $CH_2=CX(CF_2)_nY$ is $CH_2=CH(CF_2)_2F$ or $CH_2=CH(CF_2)_4F$.

(6) A method for producing the ethylene/tetrafluoroethylene copolymer as defined in any one of the above (1) to (5), which comprises copolymerizing ethylene which is a fluoromonomer, tetrafluoroethylene and as an optional component, a monomer represented by $CH_2=CX(CF_2)_nY$ (wherein each of X and Y which are independent of each other is a hydrogen atom or a fluorine atom, and n is from 2 to 8) in the presence of a radical polymerization initiator, a chain transfer agent and a polymerization medium.

Advantageous Effects of Invention

The ETFE of the present invention has a remarkably low elastic modulus at a level of at most 500 MPa and is excellent in flexibility and heat resistance, and thereby the ETFE of the present invention can be used as electric wires, tubes and films which are required to have a flexibility and heat resistance.

DESCRIPTION OF EMBODIMENTS

In the ETFE of the present invention, the repeating units to be contained are repeating units (A) based on TFE/repeating units based on ethylene (hereinafter referred to as E)=66/34 to 75/25 (molar ratio), preferably 67/33 to 75/25. When the molar ratio of the repeating units falls within the above range, the ETFE is excellent in the flexibility and the heat resistance.

The ETFE of the present invention preferably contains the repeating units (A) based on TFE and the repeating units (B) based on ethylene.

Further, in addition to the repeating units based on E and the repeating units based on TFE, ETFE preferably contains as an optional component, repeating units (C) based on a monomer represented by the formula $CH_2=CX(CF_2)_nY$ (wherein each of X and Y which are independent of each other is a hydrogen atom or a fluorine atom, and n is from 2 to 8; hereinafter referred to as FAE) within a range that innate properties of ETFE are not impaired.

The content of repeating units (C) based on FAE is from 0.01 to 1 mol %, preferably from 0.05 to 1 mol %, most preferably from 0.1 to 1 mol %, based on the total number of moles of the repeating units (A) based on ETFE and the repeating units (B) based on E. If the content of repeating units (C) based on FAE exceeds the above range, the heat resistance of ETFE is low. If the content of repeating units (C) based on FAE is lower than the above range, properties of ETFE such as the mechanical strength and the melt molding property deteriorate.

With regard to FAE, if n in the formula $CH_2=CX(CF_2)_nY$ is less than 2, stress cracks may form on molded product of ETFE. On the other hand, if n in the formula exceeds 8, the copolymerization reactivity of TFE and E is insufficient.

FAE may, for example, be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_6F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_6H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_6F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$ or $CH_2=CH(CF_2)_8H$. One or more types of FAE may be used.

Among them, in the monomer represented by $CH_2=CX(CF_2)_nY$, n=2 to 6 is more preferred since its molded product is excellent in the stress crack resistance, and n=2 to 4 is the most preferred.

As the monomer represented by $CH_2=CX(CF_2)_nY$, preferred is at least one selected from the group consisting of $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_3H$ and $CH_2=CH(CF_2)_4H$. More preferred are $CH_2=CH(CF_2)_2F$ and $CH_2=CH(CF_2)_4F$.

In addition to the repeating units (A) based on TFE, the repeating units (B) based on E and the repeating units (C) based on the monomer represented by $CH_2=CX(CF_2)_nY$, the ETFE of the present invention may contain repeating units based on other monomers.

Such other monomers may, for example, be an α-olefin such as propylene or butene; a fluoroolefin having hydrogen atoms in an unsaturated group, such as vinylidene fluoride (VDF), vinyl fluoride (VF), trifluoroethylene or hexafluoroisobutylene (HFIB); or a fluoroolefin having no hydrogen atom in an unsaturated group (provided that TFE is excluded), such as hexafluoropropylene (HFP), chlorotrifluoroethylene (CTFE), perfluoro(methyl vinyl ether) (PMVE), perfluoro(ethyl vinyl ether) (PEVE), perfluoro(propyl vinyl ether) (PPVE), perfluoro(butyl vinyl ether) (PBVE) or other perfluoro(alkyl vinyl ethers) (PAVE). One or more of such monomers may be used.

The content of repeating units based on such other monomers is preferably from 0 to 12 mol %, more preferably from 0 to 10 mol % based on the total repeating units.

The ETFE of the present invention preferably consists of the repeating units (A) based on TFE, the repeating units (B) based on E and the repeating units (C) based on the monomer represented by $CH_2=CX(CF_2)_nY$.

The ETFE of the present invention preferably has a melting point of at least 230° C., more preferably at least 232° C., most preferably at least 235° C. When the ETFE of the present invention has a melting point within the above range, the ETFE has a high heat resistance temperature, and thereby the ETFE can be used under a high temperature and can be preferably used for applications such as heat resistance electric wires or heat resistance tubes.

The ETFE of the present invention has a volume flow rate (hereinafter referred to as Q value) measured at 297° C. of from 4 to 1,000 $mm^3$/sec. The Q value is preferably from 4 to 200 $mm^3$/sec, more preferably from 4 to 100 $mm^3$/sec. The Q value is an index which represents melt flowability of a fluorocopolymer and an index of molecular weight. When the Q value is high, the molecular weight is low, and when the Q value is low, the molecular weight is high. If the Q value is lower than the above range, extrusion molding is difficult. If the Q value is higher than the above range, the mechanical strength of a fluorocopolymer deteriorates.

(Production Method of ETFE)

The method for producing ETFE is not particularly limited, and a method is usually employed wherein E and TFE are introduced into a reactor and copolymerized by means of a commonly employed radical polymerization initiator or chain transfer agent. The polymerization method may, for example, be bulk polymerization; solution polymerization using as a polymerization medium, an organic solvent such as a fluorinated hydrocarbon, a chlorinated hydrocarbon, a fluorinated chlorohydrocarbon, an alcohol or a hydrocarbon; suspension polymerization using as a polymerization medium, an aqueous medium and, if necessary, a suitable organic solvent; or emulsion polymerization using as a polymerization medium, an aqueous medium and an emulsifier. However, a solution polymerization is most preferred wherein ethylene and tetrafluoroethylene as a fluorinated monomer are copolymerized in the presence of a radical polymerization initiator, a chain transfer agent and a polymerization medium. The polymerization may be carried out in a batch system or in a continuous system by using a single reactor or multi reactor system, stirring type polymerization apparatus, tubular type polymerization apparatus, etc.

The radical polymerization initiator is preferably an initiator whereby the temperature at which the half-life period is 10 hours, is from 0 to 100° C., more preferably from 20 to 90° C. For example, an azo compound such as azobisisobutyronitrile; a peroxydicarbonate such as diisopropyl peroxydicarbonate; a peroxyester such as tert-butyl peroxypivalate, tert-butyl peroxyisobutyrate or tert-butyl peroxyacetate; a non-fluorinated diacyl peroxide such as isobutyryl peroxide, octanoyl peroxide, benzoyl peroxide or lauroyl peroxide; a fluorinated diacyl peroxide such as $(Z(CF_2)_pCOO)_2$ (wherein Z is a hydrogen atom, a fluorine atom or a chlorine atom, and p is an integer of from 1 to 10); or an inorganic peroxide such as potassium persulfate, sodium persulfate or ammonium persulfate, may, for example, be mentioned.

The polymerization medium may, for example, be an organic solvent such as a fluorinated hydrocarbon, a chlorinated hydrocarbon, a fluorinated chlorohydrocarbon, an alcohol or a hydrocarbon as mentioned above, or an aqueous medium.

The chain transfer agent may, for example, be an alcohol such as methanol or ethanol; a chlorofluorohydrocarbon such as 1,3-dichloro-1,1,2,2,3-pentafluoropropane or 1,1-dichloro-1-fluoroethane; or a hydrocarbon such as pentane, hexane or cyclohexane. The amount of the chain transfer agent is usually at a level of from 0.01 to 100 mass %, preferably from 0.1 to 80 mass %, based on the polymerization medium. By adjusting the concentration of the chain transfer agent, it is possible to adjust the melt viscosity (the molecular weight) of ETFE thereby obtainable. That is, as the concentration of the chain transfer agent is made high, it is possible to obtain ETFE having a low molecular weight.

The polymerization conditions are not particularly limited, but the polymerization temperature is usually from 0 to 100° C., more preferably from 20 to 90° C. Further, the polymerization pressure is preferably from 0.1 to 10 MPa, more preferably from 0.5 to 3 MPa. As the polymerization pressure becomes high within the above range, a molecular weight of the polymer thereby obtainable tends to be high, and the melt viscosity tends to be high, whereby by adjusting the polymerization pressure, it is possible to adjust the melt viscosity. The polymerization time may vary depending upon the polymerization temperature and the polymerization pressure, etc., but it is usually from 1 to 30 hours, more preferably from 2 to 10 hours.

As the initial charging ratio, TFE and ethylene are charged at the molar ratio of TFE and ethylene=95/5 to 98.5/1.5, and since the pressure becomes low along with the progress of the polymerization, mixed gas having a desired composition is continuously charged so as to maintain a uniform pressure, in order to obtain an ETFE having the copolymerization composition ratio described in Claim 1. Further, in a case where $CH_2=CX(CF_2)_nY$ is introduced as an optional component, a desired mol % concentration of $CH_2=CX(CF_2)_nY$ is charged based on the total number of moles of TFE and ethylene, and since the concentration becomes low along with the progress of the polymerization, $CH_2=CX(CF_2)_nY$ is continuously charged so as to maintain a uniform concentration.

The amount of ETFE to the polymerization medium at the time of termination of the polymerization is usually at a level of from 0.03 to 0.2 g/cm$^3$, and by this concentration, the molecular weight of the ETFE can be controlled. That is, the lower the concentration of the ETFE is within the above range, the lower the molecular weight of the ETFE to be obtained becomes.

(Filler, Etc.)

The ETFE composition of the present invention may be formed into a composite blended with the following filler, pigment, etc. to provide various properties. For example, it is possible to incorporate a fiber-reinforcing material such as carbon fiber, glass fiber or aramid fiber; a dimensional stabilizer such as glass beads; electroconductive or semiconductive filler such as carbon black, carbon nanotube, fluorinated CNT (carbon nanotube), stannic oxide, titanic acid black or titanic acid whisker; a transparent electroconductivity-imparting agent such as an ionized liquid; a surface modifier such as various whisker/potassium titanate, aluminum borate, carbon whisker or calcium carbonate whisker; a heat conductivity-imparting material such as graphite, magnesium oxide, a low melting point metal or a metal fiber; a sliding property-imparting material such as PTFE (polytetrafluoroethylene) lubricant; an electromagnetic wave-shielding material such as ferrite or metal; a low gas permeable reinforcing material such as nano clay, fluorinated organic treated nano clay or talc; a weight reducing material such as glass balloons; a flexibility-imparting material such as various elastomers or fluorinated rubber; a high strength-imparting material such as nylon or aramid; a coloring pigment such as titanium oxide, zinc oxide, carbon black, copper/chromium black, molybdate orange, iron oxide, chrome yellow, yellow iron oxide, titanium yellow, titanium/antimony/chrome yellow, chrome green, chrome oxide green or cobalt green; further, crystal nucleus agent; a crosslinking agent or crosslinking adjuvant such as triallyl isocyanurate; or an additive such as a blowing agent, a blowing nucleus material, a heat stabilizer, copper, a copper compound (such as copper oxide or copper iodide), an antioxidant, a photostabilizer or an infrared absorber.

(Molded Product)

The ETFE composition of the present invention can be easily molded and formed into a desired molded product by various molding methods such as injection molding, extrusion molding, blow molding, compression molding, inflation molding and transfer molding. Molded products obtainable from the ETFE composition of the present invention may be those in wide fields, such as pump casings, diaphragm valve casings, joints, packings, sealing materials, tubes, covered electric wires, sheets, films, linings, coatings, filaments, film structure components such as tent films, and printed boards.

EXAMPLES

Now, the present invention will be described in further detail with reference to Examples. However, the technical range of the present invention is by no means restricted thereto. Here, the melt viscosity, composition, melting point and tensile elongation of ETFE were measured by the following methods.

[Composition of ETFE]

Calculated from the results of the measurement of the total fluorine amount and the melt NMR measurement (nuclear magnetic resonance).

[Melting Point of ETFE]

Obtained by heating 5 mg of a sample from 100° C. to 300° C. at a rate of 10° C./min by using a scanning differential calorimeter (DSC-220CU) manufactured by Seiko Instruments Inc.).

[Volume Flow Rate (mm$^3$/sec)]

By means of a flow tester manufactured by Shimadzu Corporation, an extrusion rate when ETFE is extruded from an orifice having a diameter of 2.1 mm and a length of 8 mm under a load of 7 kg at 297° C., was measured as a volume flow rate.

[Elastic Modulus (MPa)]

A film having a thickness of 0.3 mm prepared by melting ETFE at 300° C., followed by press molding was used as a sample. Elastic viscosity (DVA-200, manufactured by ITK Co., Ltd.) was used to measure the elastic modulus at room temperature at a frequency of 10 Hz.

[Heat Resistance]

ETFE was melted at 300° C., followed by press molding to prepare a film. In air atmosphere, the film was placed on a watch glass and kept in an oven at 320° C. for 2 hours. The presence of coloration and bubbles of the film after the test were visually observed. This test is an accelerated test to examine the heat resistance of ETFE and carried out at a temperature higher than the melting point of ETFE.

Example 1

A polymerization reactor equipped with a stirrer and having an internal capacity of 1.3 liters, was deaerated, and 850.6 g of 1-hydrotridecafluorohexane, 364.5 g of 1,3-dichloro-1,1,2,2,3-pentafluoropropane and 2.64 g of $CH_2=CH(CF_2)_4F$ were charged; 210.7 g of TFE and 1.2 g of ethylene (hereinafter referred to as E) were injected; the interior of the polymerization reactor was heated to 66° C.; and 4.8 mL of a 1-hydrotridecafluorohexane solution containing 0.5 mass % of tert-butyl peroxypivalate was charged as the polymerization initiator to initiate the polymerization.

A monomer mixed gas with a composition of TFE/E=70/30 (molar ratio) was continuously charged, so that the pressure was kept constant during the polymerization, and $CH_2=CH(CF_2)_4F$ was continuously charged so as to be 0.7 mol % to the monomer mixed gas of TFE/E. After 2.9 hours from the initiation of the polymerization, and at the time when 90 g of the monomer mixed gas of monomers was charged, the internal temperature of the polymerization reactor was lowered to room temperature, and at the same time, purging was carried out to atmospheric pressure.

The obtained slurry ETFE1 was filtrated under reduced pressure with a glass filter, and the obtained ETFE1 was dried at 120° C. for 15 hours to obtain 95 g of ETFE1. The polymer composition of the ETFE1 was repeating units based on TFE/repeating units based on E/repeating units based on $CH_2=CH(CF_2)_4F=70.9/29.1/0.9$ in a molar ratio. The melting point of ETFE1 was 235° C., and Q value was 4.1 mm$^3$/sec.

The ETFE1 was melted at 300° C., followed by press molding to prepare film 1 having a thickness of 0.3 mm.

The elastic modulus of film 1 was 480 MPa. Results of the heat resistance tests are shown in Table 1.

Example 2

A polymerization reactor equipped with a stirrer and having an internal capacity of 1.3 liters, was deaerated, and 812.3 g of 1-hydrotridecafluorohexane and 400.1 g of 1,3-dichloro-1,1,2,2,3-pentafluoropropane were charged; 196 g of TFE and 1.12 g of E were injected; the interior of the polymerization reactor was heated to 66° C.; and 0.96 mL of a 1-hydrotridecafluorohexane solution containing 0.5 mass % of tert-butyl peroxypivalate was charged as the polymerization initiator to initiate the polymerization.

A monomer mixed gas with a composition of TFE/E=70/30 (molar ratio) was continuously charged, so that the pressure was kept constant during the polymerization. After 1.25 hours from the initiation of the polymerization, and at the time when 50 g of the monomer mixed gas of monomers was charged, the internal temperature of the polymerization reactor was lowered to room temperature, and at the same time, purging was carried out to atmospheric pressure.

The obtained slurry ETFE2 was filtrated under reduced pressure with a glass filter, and the obtained ETFE2 was dried at 120° C. for 15 hours to obtain 52 g of ETFE2. The polymer composition of the ETFE2 was repeating units based on TFE/repeating units based on E=71.4/28.6 in a molar ratio. The melting point of ETFE2 was 239° C., and Q value was 9.6 mm$^3$/sec.

The ETFE2 was melted at 300° C., followed by press molding to prepare film 2 having a thickness of 0.3 mm.

The elastic modulus of film 2 was 400 MPa. Results of the heat resistance tests are shown in Table 1.

Comparative Example 1

A polymerization reactor equipped with a stirrer and having an internal capacity of 1.3 liters, was deaerated, and 876.2 g of 1-hydrotridecafluorohexane and 340.8 g of 1,3-dichloro-1,1,2,2,3-pentafluoropropane were charged; 180.5 g of TFE and 2.66 g of E were injected; the interior of the polymerization reactor was heated to 66° C.; and 1.3 mL of a 1-hydrotridecafluorohexane solution containing 0.5 mass % of tert-butyl peroxypivalate was charged as the polymerization initiator to initiate the polymerization.

A monomer mixed gas with a composition of TFE/E=70/30 (molar ratio) was continuously charged, so that the pressure was kept constant during the polymerization. After 1.78 hours from the initiation of the polymerization, and at the time when 50 g of the monomer mixed gas of monomers was charged, the internal temperature of the polymerization reactor was lowered to room temperature, and at the same time, purging was carried out to atmospheric pressure.

The obtained slurry ETFE3 was filtrated under reduced pressure with a glass filter, and the obtained ETFE3 was dried at 120° C. for 15 hours to obtain 53 g of ETFE3. The polymer composition of the ETFE3 was repeating units based on TFE/repeating units based on E=64.9/35.1 in a molar ratio. The melting point of ETFE3 was 253° C., and Q value was 9.0 mm$^3$/sec.

The ETFE3 was melted at 300° C., followed by press molding to prepare film 3 having a thickness of 0.3 mm.

The elastic modulus of film 3 was 950 MPa. Results of the heat resistance tests are shown in Table 1.

Comparative Example 2

As ETFE4, "FLUON ETFE•C-5AP", manufactured by ASAHI GLASS CO., LTD. (melting point: 264° C., Q value: 7.5, elastic modulus: 1000 MPa) was used for comparison.

On ETFE4, the ratio of repeating units based on TFE/repeating units based on E=54.1/45.9, and ETFE4 contains 1 mol % of a third component based on the total of the repeating units based on TFE/and the repeating units based on E The ETFE4 was melted at 300° C., followed by press molding to prepare film 4 having a thickness of 0.3 mm. Results of the heat resistance tests are shown in Table 1.

TABLE 1

|  | Molar ratio of TFE/E/third component | Melting point (° C.) | Q Value (mm$^3$/sec) | Elastic modulus (MPa) | Heat resistance test Bubbles | Heat resistance test Coloration |
|---|---|---|---|---|---|---|
| Ex. 1 | 70.9/29.1/0.9 | 235 | 4.1 | 480 | None | None |
| Ex. 2 | 71.4/28.6/0 | 239 | 9.6 | 400 | None | None |
| Comp. Ex. 1 | 64.9/35.1/0 | 253 | 9.0 | 950 | Formed | Colored |
| Comp. Ex. 2 | 54.1/45.9/1.0 | 264 | 7.5 | 1,000 | Formed | Colored |

INDUSTRIAL APPLICABILITY

The ETFE of the present invention is excellent in flexibility and thereby useful in applications such as tubes, films or insulating coating materials.

This application is a continuation of PCT Application No. PCT/JP2010/061562 filed on Jul. 7, 2010, which is based upon and claims the benefit of priority from Japanese Application No. 2009-164415 filed on Jul. 13, 2009. The contents of those applications are incorporated herein by reference in its entirety.

What is claimed is:

1. An ethylene/tetrafluoroethylene copolymer consisting of repeating units (A) based on tetrafluoroethylene, (B) based on ethylene in a ratio of repeating units (A)/repeating units (B)=70.9/29.1 to 75/25 (molar ratio), and as an optional component, repeating units (C) based on a monomer represented by $CH_2=CX(CF_2)_nY$ wherein each of X and Y which are independent of each other is a hydrogen atom or a fluorine atom, and n is from 2 to 8 in an amount of from 0 to 1 mol % based on the total number of moles of the repeating units (A) and (B), said ethylene/tetrafluoroethylene copolymer having a volume flow rate measured at 297° C. of from 4 to 1,000 mm³/sec and an elastic modulus of at most 500 MPa.

2. The ethylene/tetrafluoroethylene copolymer according to claim 1, wherein the ethylene/tetrafluoroethylene copolymer further consists of the repeating units (C).

3. The ethylene/tetrafluoroethylene copolymer according to claim 2, wherein the monomer represented by $CH_2=CX(CF_2)_nY$ is $CH_2=CH(CF_2)_2F$ or $CH_2=CH(CF_2)_4F$.

4. The ethylene/tetrafluoroethylene copolymer according to claim 3, wherein the monomer represented by $CH_2=CX(CF_2)_nY$ is $CH_2=CH(CF_2)_4F$.

5. The ethylene/tetrafluoroethylene copolymer according to claim 2, consisting of repeating units (A) based on tetrafluoroethylene, (B) based on ethylene in a ratio of repeating units (A)/repeating units (B)=70.9/29.1 to 75/25 (molar ratio), and (C) based on a monomer represented by $CH_2=CX(CF_2)_nY$ wherein each of X and Y which are independent of each other is a hydrogen atom or a fluorine atom, and n is from 2 to 8 in an amount of from 0.1 to 1 mol % based on the total number of moles of the repeating units (A).

6. The ethylene/tetrafluoroethylene copolymer according to claim 5, wherein the monomer represented by $CH_2=CX(CF_2)_nY$ is $CH_2=CH(CF_2)_4F$.

7. The ethylene/tetrafluoroethylene copolymer according to claim 2, wherein the ethylene/tetrafluoroethylene copolymer has a melting point of at least 230° C.

8. The ethylene/tetrafluoroethylene copolymer according to claim 2, wherein the ethylene/tetrafluoroethylene copolymer has a melting point of at least 235° C.

9. The ethylene/tetrafluoroethylene copolymer according to claim 8, wherein said ethylene/tetrafluoroethylene copolymer has a volume flow rate measured at 297° C. of from 4 to 100 mm³/sec.

10. A method for producing the ethylene/tetrafluoroethylene copolymer as defined in claim 1, which comprises copolymerizing ethylene, tetrafluoroethylene and as an optional component, a monomer represented by $CH_2=CX(CF_2)_nY$ wherein each of X and Y which are independent of each other is a hydrogen atom or a fluorine atom, and n is from 2 to 8 in the presence of a radical polymerization initiator, a chain transfer agent and a polymerization medium.

11. The ethylene/tetrafluoroethylene copolymer according to claim 1, wherein the ethylene/tetrafluoroethylene copolymer does not contain repeating units (C).

12. The ethylene/tetrafluoroethylene copolymer according to claim 11, consisting of repeating units (A) based on tetrafluoroethylene, and (B) based on ethylene in a ratio of repeating units (A)/repeating units (B)=70.9/29.1 to 75/25 (molar ratio).

13. The ethylene/tetrafluoroethylene copolymer according to claim 11, wherein the ethylene/tetrafluoroethylene copolymer has a melting point of at least 230° C.

14. The ethylene/tetrafluoroethylene copolymer according to claim 11, wherein the ethylene/tetrafluoroethylene copolymer has a melting point of at least 235° C.

15. The ethylene/tetrafluoroethylene copolymer according to claim 14, said ethylene/tetrafluoroethylene copolymer has a volume flow rate measured at 297° C. of from 4 to 100 mm³/sec.

16. The ethylene/tetrafluoroethylene copolymer according to claim 1, wherein said elastic modulus is from 400 to 500 MPa.

* * * * *